3,096,334
6-METHOXY-8-(5 - n - PROPYLAMINOPENTYLAMINO)QUINOLINE, ITS SALTS AND ITS PREPARATION

Edgar Alfred Steck, Metuchen, N.J., assignor to Sterling Drug Inc., New York, N.Y., a corporation of Delaware
No Drawing. Filed Jan. 9, 1957, Ser. No. 633,199
4 Claims. (Cl. 260—286)

This invention relates to compositions of matter of the class of 6-methoxy-8-(substituted)-aminoquinolines. In particular, this invention is concerned with 6-methoxy-8-(5-n-propylaminopentylamino)quinoline, its acid addition salts, and the preparation of these compounds.

From the early 1920's to the late 1940's a large number of 8-aminoquinoline derivatives were synthesized and investigated for chemotherapeutic properties, in particular, antimalarial activity. The outstanding compound resulting from early studies in Germany was 6-methoxy-8-(5-diethylamino-2-pentylamino)quinoline, now better known as pamaquine.

During and after World War II an intensive and widespread search involving the cooperative efforts of many individuals and agencies was made in this country to find better antimalarials. Of the hundreds of 8-aminoquinolines prepared and tested, only a few showed promise of being superior to pamaquine for the treatment of vivax malaria. The outstanding compound was 6-methoxy-8-(5-amino-2-pentylamino)quinoline, better known now as primaquine.

I have now found my novel compound which in free base form has the formula

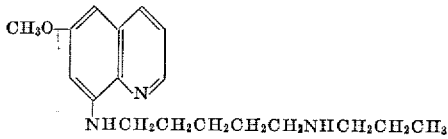

$$\text{NHCH}_2\text{CH}_2\text{CH}_2\text{CH}_2\text{CH}_2\text{NHCH}_2\text{CH}_2\text{CH}_3$$

to possess advantages over primaquine. My compound is not only less toxic than primaquine but it is also more effective as an antimalarial agent. My compound was found to be more than twenty times more effective than primaquine against *Plasmodium lophurae* in ducks and about two to three times more effective than primaquine against blood-induced *Plasmodium cynomolgi* infection in the rhesus monkey.

I prepared my new 8-aminoquinoline by heating 6-methoxy-8-aminoquinoline with a 5-n-propylaminopentyl halide hydrohalide, making the reaction mixture alkaline and isolating the product in the form of its free base. I used 5-n-propylaminopentyl chloride hydrochloride because of its lower cost and relative ease of preparation; the corresponding bromide hydrobromide also can be used. The reaction can be carried out in the temperature range of 50 to 150° C., preferably between 75 and 105° C. While the preferred reaction medium was water, other aqueous media can be used such as mixtures of water and lower alkanols, e.g., methanol, ethanol.

It was convenient to isolate and use the basic quinoline of my invention as the water soluble phosphoric acid addition salt, the particular phosphate isolated being the monophosphate. It is, of course, understood that other water soluble salts, such as those derived from other non-toxic inorganic acids, including hydrochloric acid, hydrobromic acid, sulfuric acid, sulfamic acid, and the like, and non-toxic organic acids, including tartaric acid, citric acid, succinic acid, acetic acid, benzoic acid, oleic acid, and the like, will serve the same purpose and are within the scope of my invention.

The molecular structure of my new 8-aminoquinoline is established by its mode of synthesis and corroborated by the correspondence of calculated and found values for the elementary and acid analyses for its phosphate salt.

The following examples will further illustrate the invention without, however, limiting it thereto.

Examples

*5-n-propylaminopentanol.*—To a prechilled (0.5° C.) solution of 28 ml. of concentrated hydrochloric acid in 333 ml. of water, there was added 112 g. of dihydropyran, whereupon the temperature rose rapidly to about 40° C. The mixture was stirred for ten minutes, resulting in a clear pale yellow solution which was then cooled to about 10–15° C. To the cooled solution there was added 22 g. of n-propylamine, followed by an additional 79 g. of n-propylamine keeping the temperature below 20° C. during the addition. The solution was then subjected to catalytic reduction using 1 g. of platinum oxide at an initial pressure of 2525 lbs. p.s.i. at 27° C. Reduction required four hours and the uptake of hydrogen was 80% of theory. The catalyst was filtered off and the filtrate made basic by the addition of solid sodium hydroxide until a pH of 9 was obtained. The mixture was distilled until the temperature of the vapor had reached 95° C., at which point two layers had appeared in the distilling flask. The lower layer was drawn off and the upper (aqueous) layer was extracted, portionwise, with a total of 800 ml. of n-hexane. The extracts and the lower layer were combined and dried using a water separator. The dried product, 5-n-propylaminopentanol, separated as a layer in the n-hexane. The mixture was chilled and treated with dry hydrogen chloride gas (over the surface) until the reaction mixture was strongly acidic. The precipitated hydrochloride was collected, washed with absolute ether and recrystallized from isopropanol-absolute ether with the aid of decolorizing charcoal, resulting in 84 g. of product, 5-n-propylaminopentanol hydrochloride. A 10 g. portion of this product was recrystallized from absolute ethanol-acetone (ratio of 1 to 18), yielding 8.5 g. of the purified hydrochloride, M.P. 101.2–102.0° C. (corr.).

*Analysis.*—Calcd. for $C_8H_{19}NO.HCl$: N, 7.71; Cl⁻, 19.51. Found: N, 7.78; Cl⁻, 19.48.

*5-n-propylaminopentyl chloride.*—To a suspension of 80.4 g. of 5-n-propylaminopentanol hydrochloride in 445 ml. of n-hexane was added over a period of two hours 58.5 g. of pure thionyl chloride, keeping the temperature range at about 0°–5° C. At the end of the addition, the temperature was raised to about 50° C. for one hour, followed by reflux for six hours. About 100 ml. of n-hexane was thereafter removed in vacuo to remove the excess thionyl chloride. The solid that had separated was collected and recrystallized from acetone-absolute ether (300 ml. to 100 ml.), yielding 70 g. of 5-n-propylaminopentyl chloride hydrochloride as white needles, M.P. 199–203.4° C. (corr.).

*Analysis.*—Calcd. for $C_8H_{18}ClN.HCl$: N, 7.00; Cl⁻, 17.72. Found: N, 6.97; Cl⁻, 17.60.

*6 - methoxy - 8 - (5-n-propylaminopentylamino)quinoline.*—A mixture of 40 g. of 5-n-propylaminopentyl chloride hydrochloride, 50 ml. of water and 69.6 g. of methoxy-8-aminoquinoline was heated at about 80° C. with stirring for twenty hours. Heating was then continued for an additional four hours in the range of 99–102° C. The reaction mixture was diluted with 200 ml. of water and the pH was adjusted carefully by the addition of sodium hydroxide to pH 4.5 and then sodium acetate to pH 5.1. The resulting solution was heated to 65° C. and extracted four times with 200 ml. portions of benzene to remove the unreacted 6-methoxy-8-aminoquinoline. The benzene extracts were combined and washed with 20 ml. of hot water. The water wash was added to the aqueous reaction mixture and the resulting solution chilled, producing a mass of dark brown needles, the crude hydrochloride salt of 6-methoxy-8-(5-n-propylaminopentylamino)quinoline. The product was collected, redissolved in 200 ml. of water at about 50° C., and the resulting solution was treated with a solution of 10 g. of sodium hydroxide in 20 ml. of water. The mixture was cooled to about 25° C. and extracted with four 150 ml. portions of ether. The combined ether extracts were washed with water and dried over anhydrous sodium sulfate. Removal of the ether by distilling in vacuo yielded 38.2 g. of 6-methoxy-8-(5-n-propylaminopentylamino)quinoline, as an oil. This product was converted into its monophosphate salt as follows: To a vigorously stirred solution of 14.8 g. of 6-methoxy-8-(5-n-propylaminopentylamino)quinoline in 150 ml. of absolute ether there was added a solution of 5.2 g. of 85% phosphoric acid in 50 ml. of absolute ethanol. A gummy red mass resulted which solidified when triturated. The solid was collected and recrystallized twice from absolute ethanol, yielding 17 g. of 6-methoxy-8-(5-n-propylaminopentylamino)quinoline monophosphate as tan platelets, M.P. 82–88° C. (corr.).

*Analysis.*—Calcd. for $C_{18}H_{27}N_3O \cdot H_3PO_4$: N, 10.52; $H_3PO_4$, 24.54. Found (corrected for 3.50% loss at 100° C. in vacuo; of this total, 1.04% was moisture as determined by the Karl Fischer procedure): N, 10.68; $H_3PO_4$, 24.58.

When tested against *Plasmodium lophurae* infection in Pekin ducks, 6-methoxy-8-(5-n-propylaminopentylamino)-quinoline monophosphate administered orally in gelatin solution by stomach tube at a dose of 0.5 mg. (in terms of base) per kg. per day for five days was found to be more effective than primaquine diphosphate at a dose of 10.0 mg. (in terms of base) per kg. per day. The acute oral toxicity in mice of 6-methoxy-8-(5-n-propylaminopentylamino)quinoline monophosphate was found to be, in terms of its base, 234±36 mg. per kg. after seven days; in comparison, the acute oral toxicity in mice of primaquine diphosphate was found to be, in terms of its base, 113±22 mg. per kg. after seven days.

Another aspect of my invention resides in antimalarial compositions including the novel compounds disclosed herein together with an adjuvant. By an adjuvant I mean any inert substance or substances used to give the compositions a suitable form or consistency. For practical medication, my new compounds are conveniently administered orally in solid form with the aid of a carrier. Thus, the compounds can be formulated in unit dosage form as tablets in combination with an adjuvant such as one or more of the following: calcium carbonate, starch, lactose, gelatin, talc, magnesium stearate, acacia, and the like. My compounds can also be advantageously combined with other antimalarials, for example, quinine or chloroquine, when desired. Illustrative of a tablet formulation of my compounds is one weighing 125 mg. and containing 20 mg. of 6-methoxy-8-(5-n-propylaminopentylamino)quinoline monophosphate, 33.5 mg. of lactose as a diluent, 33 mg. of starch as a disintegrator, 1.0 mg. of magnesium stearate and 37.5 mg. of talc as lubricants.

I claim:

1. A compound selected from the group consisting of 6-methoxy-8-(5-n-propylaminopentylamino)quinoline and non-toxic acid addition salts thereof.
2. 6 - methoxy-8-(5-n-propylaminopentylamino)quinoline.
3. A non-toxic acid addition salt of 6-methoxy-8-(5-n-propylaminopentylamino)quinoline.
4. 6 - methoxy-8-(5-n-propylaminopentylamino)quinoline monophosphate.

References Cited in the file of this patent

UNITED STATES PATENTS 2,492,467  Drake _____ Dec. 27, 1949

OTHER REFERENCES

Wiselogle: Survey of Anti-Malarial Drugs, vol. II, part 2, pp. 1183–1189 (1946).

UNITED STATES PATENT OFFICE
CERTIFICATE OF CORRECTION

Patent No. 3,096,334            July 2, 1963

Edgar Alfred Steck

It is hereby certified that error appears in the above numbered patent requiring correction and that the said Letters Patent should read as corrected below.

Column 2, lines 60 and 61, for "69.6 g. of methoxy-8-aminoquinoline" read -- 69.6 g. of 6-methoxy-8-aminoquinoline --.

Signed and sealed this 28th day of January 1964.

(SEAL)
Attest:

ERNEST W. SWIDER
Attesting Officer

EDWIN L. REYNOLDS

Acting Commissioner of Patents